US009749257B2

United States Patent
Wells et al.

(10) Patent No.: US 9,749,257 B2
(45) Date of Patent: Aug. 29, 2017

(54) METHOD AND APPARATUS FOR DYNAMICALLY DEPLOYING SOFTWARE AGENTS

(71) Applicant: kCura LLC, Chicago, IL (US)

(72) Inventors: Daniel Wells, Evanston, IL (US); Kevin McCarty, Chicago, IL (US); Christopher Hogan, Lombard, IL (US); Konrad Makowski, Harwood Heights, IL (US); Justin Smits, Elmhurst, IL (US)

(73) Assignee: KCURA LLC, Chicago, IL (US)

( * ) Notice: Subject to any disclaimer, the term of this patent is extended or adjusted under 35 U.S.C. 154(b) by 406 days.

(21) Appl. No.: 14/062,492

(22) Filed: Oct. 24, 2013

(65) Prior Publication Data

US 2015/0120926 A1    Apr. 30, 2015

(51) Int. Cl.
*G06F 9/50*     (2006.01)
*H04L 12/919*   (2013.01)
*G06F 9/48*     (2006.01)
*G06F 9/445*    (2006.01)
*H04L 12/911*   (2013.01)

(52) U.S. Cl.
CPC .............. *H04L 47/765* (2013.01); *G06F 8/60* (2013.01); *G06F 9/4806* (2013.01); *G06F 9/4843* (2013.01); *H04L 47/70* (2013.01)

(58) Field of Classification Search
CPC ........ G06F 8/60; G06F 9/4843; G06F 9/4806; H04L 47/70; H04L 47/765
See application file for complete search history.

(56) References Cited

U.S. PATENT DOCUMENTS

| | | | |
|---|---|---|---|
| 5,812,529 A * | 9/1998 | Czarnik et al. | 370/245 |
| 6,460,070 B1 * | 10/2002 | Turek | G06F 11/0709 709/202 |
| 7,222,151 B1 * | 5/2007 | Schaeck | 709/202 |
| 7,415,512 B1 * | 8/2008 | Moon | 709/220 |
| 7,506,038 B1 * | 3/2009 | Perrone et al. | 709/220 |
| 8,335,851 B1 * | 12/2012 | Vendrow | 709/226 |
| 2003/0084134 A1 * | 5/2003 | Pace et al. | 709/223 |
| 2005/0144218 A1 * | 6/2005 | Heintz | 709/202 |
| 2006/0095914 A1 * | 5/2006 | Mankovski | 718/100 |
| 2010/0313185 A1 * | 12/2010 | Gupta et al. | 717/124 |
| 2012/0072762 A1 * | 3/2012 | Atchison | G06F 9/5072 714/2 |
| 2013/0268861 A1 * | 10/2013 | Bailey | G06F 9/5072 715/735 |

OTHER PUBLICATIONS

European Patent Office, International Search Report and Written Opinion for PCT Application No. PCT/US2014/062111, mailed Feb. 6, 2015.

* cited by examiner

*Primary Examiner* — Aaron Strange
(74) *Attorney, Agent, or Firm* — Marshall, Gerstein & Borun LLP; Randall G. Rueth

(57) ABSTRACT

Methods and apparatus for dynamically deploying software agents are disclosed. For example, a user of an electronic record management system may deploy a plurality of different background processes (e.g., OCR, dedup, etc.) that may each take several hours to complete. Subsequently, the user may decide to change the number of servers dedicated to one or more background process. In addition, the user may decide to deploy additional background processes. Neither of these user actions interrupts any of the background processes.

27 Claims, 6 Drawing Sheets

METHOD AND APPARATUS FOR DYNAMICALLY DEPLOYING SOFTWARE AGENTS

The present disclosure relates in general to electronic record management, and, in particular, to methods and apparatus for dynamically deploying software agents.

BACKGROUND

The vast majority of documents we create and/or archive are stored electronically. In order to quickly find certain documents, the relevant data from these documents is typically extracted, catalogued, and organized in a database to make them searchable. In some circumstances, these databases can be very large. For example, a lawsuit may involve over a million documents. Performing software operations, such as optical character recognition and deduplication, on these large numbers of documents can be problematic. Depending on the size of the document collection, the software operation may take hours or even days.

As a result, these time-consuming operations are often run as a background process by a plurality of servers. However, each time a new background process is started, a software agent designed to carry out that background process is manually deployed. Manual agent deployment includes an administrator running one or more custom installers causing other background process executing on the plurality of servers to be interrupted. Similarly, if a user decides to change the number of servers dedicated to one background process, other background processes may be interrupted. These interruptions are problematic and error prone.

DETAILED DESCRIPTION OF THE PREFERRED EMBODIMENTS

Briefly, methods and apparatus for dynamically deploying software agents are disclosed. For example, a user of an electronic record management system may deploy a plurality of different background processes (e.g., OCR, dedup, etc.) that may each take several hours to complete. Subsequently, the user may decide to change the number of servers dedicated to one or more background process. In addition, the user may decide to deploy additional background processes. Neither of these user actions interrupts any of the background processes.

Figure 1:
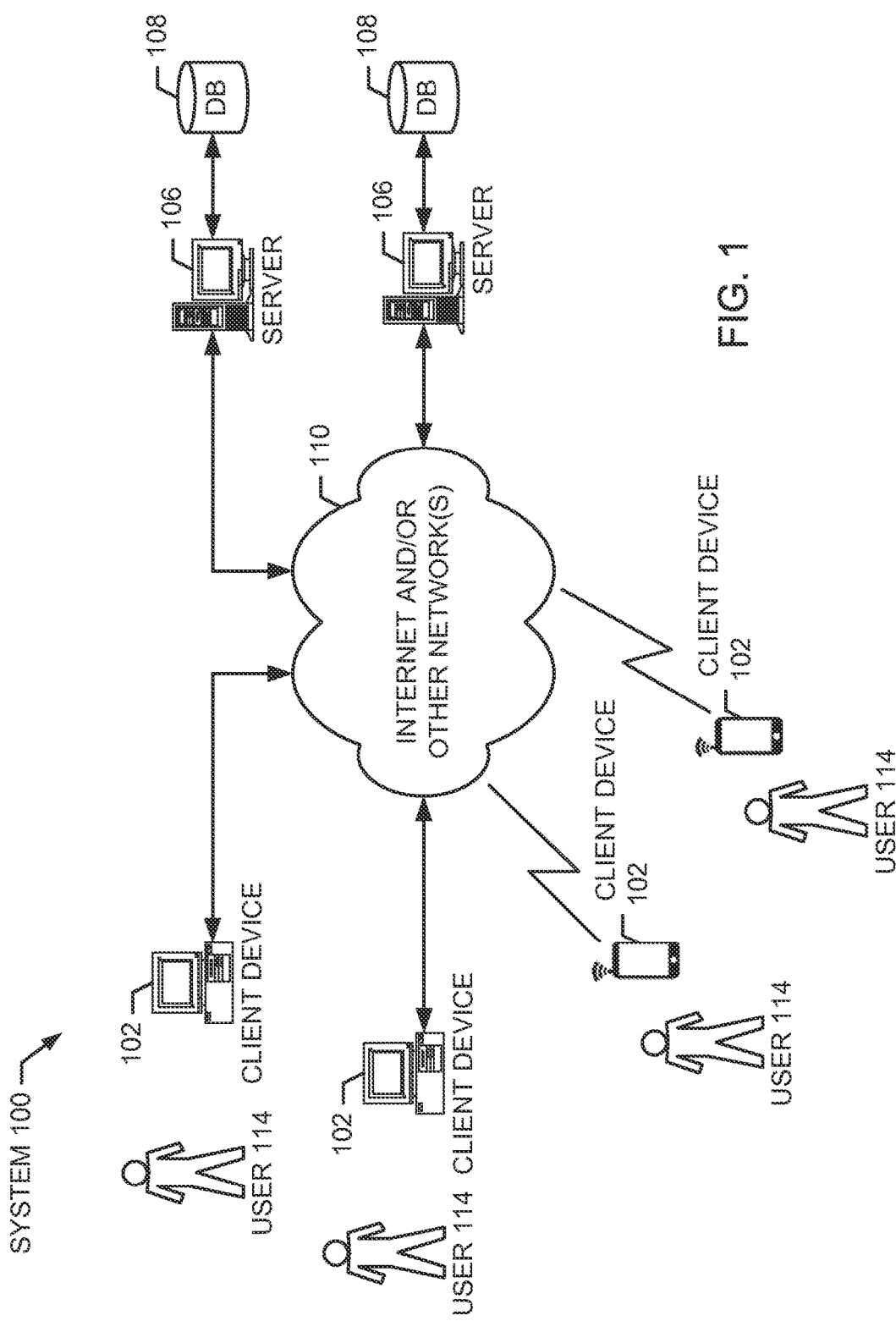
FIG. 1 is a block diagram of an example network communication system.

Turning now to the figures, the present system is most readily realized in a network communication system 100. A block diagram of certain elements of an example network communication system 100 is illustrated in FIG. 1. The illustrated system 100 includes one or more client devices 102 (e.g., computer, television, camera, phone), one or more web servers 106, and one or more databases 108. Each of these devices may communicate with each other via a connection to one or more communications channels 110 such as the Internet or some other wired and/or wireless data network, including, but not limited to, any suitable wide area network or local area network. It will be appreciated that any of the devices described herein may be directly connected to each other instead of over a network. In addition, for ease in explanation, this description may refer to a client device 102 and a server 106 communicating (e.g., an interactive website). It will be appreciated that any number of client devices 102 and servers 106 may be used in the same manner as the simplified one-to-one examples used herein.

The web server 106 stores a plurality of files, programs, and/or web pages in one or more databases 108 for use by the client devices 102 as described in detail below. The database 108 may be connected directly to the web server 106 and/or via one or more network connections. The database 108 stores data as described in detail below.

One web server 106 may interact with a large number of client devices 102. Accordingly, each server 106 is typically a high end computer with a large storage capacity, one or more fast microprocessors, and one or more high speed network connections. Conversely, relative to a typical server 106, each client device 102 typically includes less storage capacity, a single microprocessor, and a single network connection.

Figure 2:
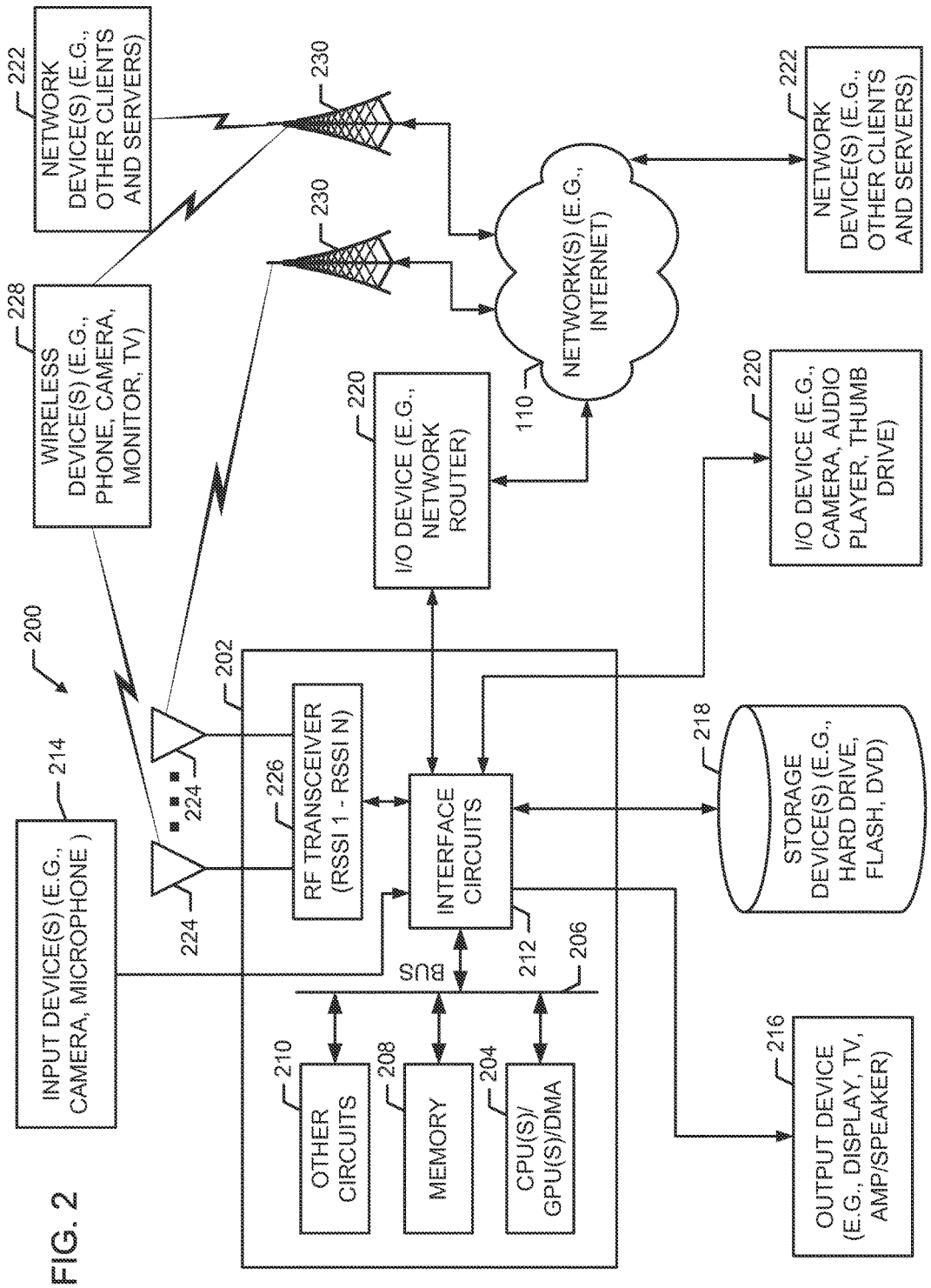
FIG. 2 is a block diagram of an example computing device.

Each of the devices illustrated in FIG. 1 (e.g., client 102 and/or server 106) may include certain common aspects of many computing devices such as microprocessors, memories, direct memory access units, peripherals, etc. FIG. 2 is a block diagram of an example computing device.

The example computing device 200 includes a main unit 202 which may include, if desired, one or more processing units 204 electrically coupled by an address/data bus 206 to one or more memories 208, other computer circuitry 210, and one or more interface circuits 212. The processing unit 204 may include any suitable processor or plurality of processors. In addition, the processing unit 204 may include other components that support the one or more processors. For example, the processing unit 204 may include a central processing unit (CPU), a graphics processing unit (GPU), and/or a direct memory access (DMA) unit.

The memory 208 may include various types of non-transitory memory including volatile memory and/or non-volatile memory such as, but not limited to, distributed memory, read-only memory (ROM), random access memory (RAM) etc. The memory 208 typically stores a software program that interacts with the other devices in the system as described herein. This program may be executed by the processing unit 204 in any suitable manner. The memory 208 may also store digital data indicative of documents, files, programs, web pages, etc. retrieved from a server and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, isopoint, camera, voice recognition system, accelerometer, global positioning system (GPS), and/or any other suitable input device.

One or more displays, printers, speakers, monitors, televisions, high definition televisions, and/or other suitable output devices 216 may also be connected to the main unit 202 via the interface circuit 212. For example, a display for displaying video data may be a cathode ray tube (CRTs), liquid crystal displays (LCDs), electronic ink (e-ink), and/or any other suitable type of display.

One or more storage devices 218 may also be connected to the main unit 202 via the interface circuit 212. For example, a hard drive, CD drive, DVD drive, and/or other storage devices may be connected to the main unit 202. The storage devices 218 may store any type of data used by the device 200.

The computing device 200 may also exchange data with one or more input/output (I/O) devices 220. For example, I/O devices 220 may include network routers, cameras, audio players, thumb drives etc.

The computing device 200 may also exchange data with other network devices 222 via a connection to a network 110. The network connection may be any type of network connection, such as an Ethernet connection, digital subscriber line (DSL), telephone line, coaxial cable, wireless base station 230, etc. Users 114 of the system 100 may be required to register with a server 106. In such an instance, each user 114 may choose a user identifier (e.g., e-mail address) and a password which may be required for the activation of services. The user identifier and password may be passed across the network 110 using encryption built into the user's browser. Alternatively, the user identifier and/or password may be assigned by the server 106.

In some embodiments, the computing device 200 may be a wireless device 200. In such an instance, the device 200 may include one or more antennas 224 connected to one or more radio frequency (RF) transceivers 226. The transceiver 226 may include one or more receivers and one or more transmitters operating on the same and/or different frequencies. For example, the device 200 may include a Bluetooth transceiver, a Wi-Fi transceiver, and/or diversity cellular transceivers. The transceiver(s) 226 allow the device 200 to exchange signals, such as voice, video and any other suitable data, with other wireless devices 228, such as a phone, camera, monitor, television, and/or high definition television. For example, the device 200 may send and receive wireless telephone signals, text messages, audio signals and/or video signals directly and/or via a base station 230.

Figure 3:
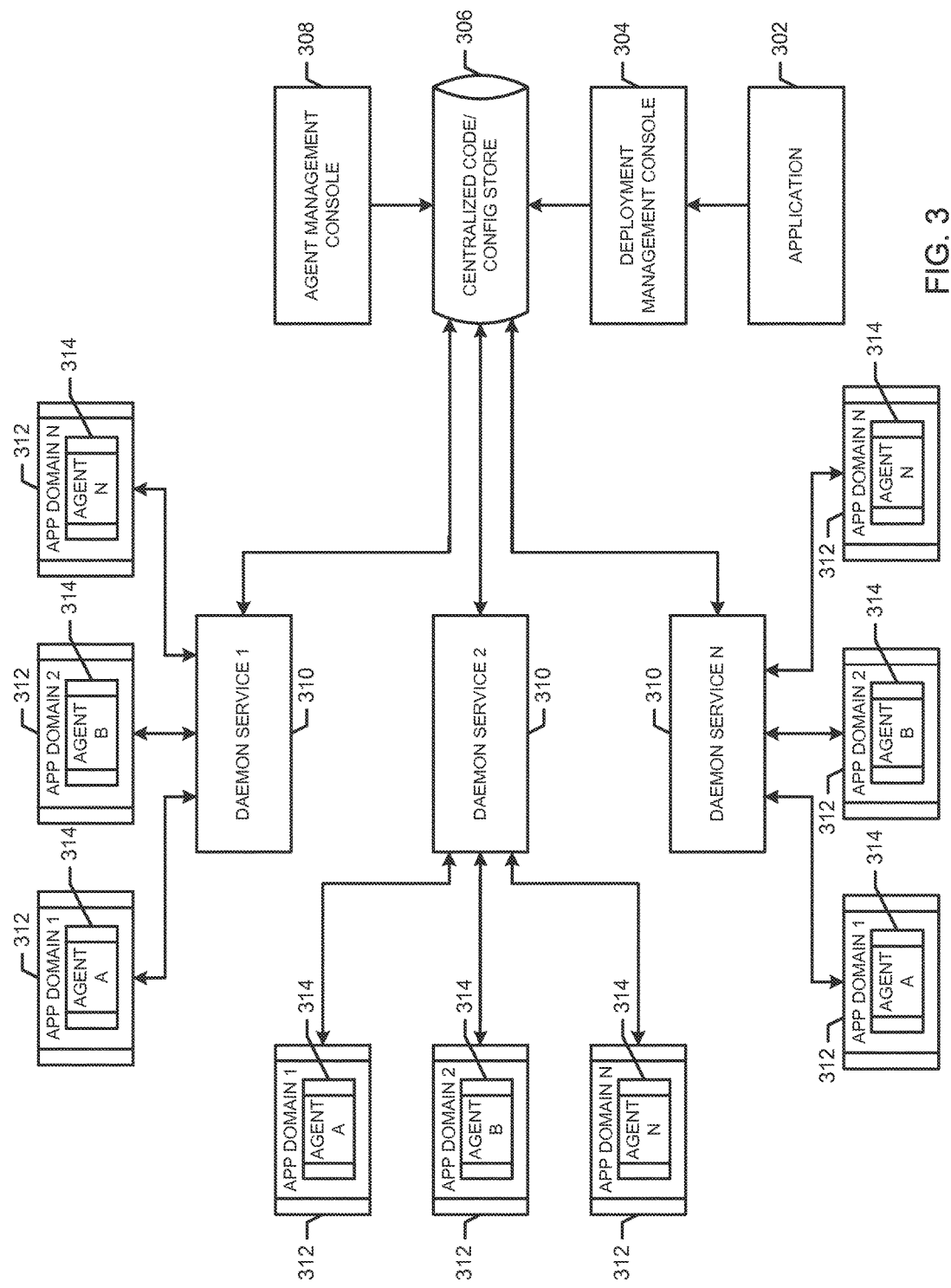
FIG. 3 is a block diagram of example computing devices cooperating in a network communication system to execute software agents.

FIG. 3 is a block diagram of example computing devices cooperating in a network communication system to dynamically deploy software agents. For example, a user 114 of an electronic record management system may deploy a background optical character recognition (OCR) process initially using 10 servers. The background OCR process may take several hours to complete. Subsequently, the user 114 may decide to speed up the background OCR process by increasing the number of servers dedicated to the background OCR process to 20 servers. Switching the background OCR process from 10 servers to 20 servers does not interrupt the background OCR process.

Subsequently, the user 114 may decide to reduce the number of servers dedicated to the background OCR process to 5 servers in order to free some of the servers for other tasks. For example, the user 114 may deploy a background deduplication process using 14 servers and then later decide to reduce the deduplication process to 7 servers. Switching the background OCR process from 20 servers to 5 servers does not interrupt the background OCR process. In addition, deploying the background deduplication process does not interrupt the background OCR process. Further, reducing the deduplication process to 7 servers does not interrupt the background OCR process and does not interrupt the background deduplication process.

In the example illustrated in FIG. 3, an application 302 communicates with a deployment management console 304. The application 302 is a component of the system where users 114 are able to package their code and custom agents. Users can then export the entire application via the deployment management console 304 and can give a single file package to environment administrators to install in their application environment. The deployment management console 304 allows users 114 to import/export background agents to and from an instance of an application. All of this application data is preferably centrally stored in a database 306 for easy access by all components of the system.

An agent management console 308 allows users 114 to easily administer all of the agent servers in a grid computing environment without a need to access each server to make changes. For example, using the agent management console 308, users 114 are able to specify how many agents 314 and what type of agents should run on a particular server. Users 114 may also dynamically change the logging requirements for each agent 314 instance on a server and dynamically change the time interval at which an agent 314 should execute its business logic. Users 114 may also dynamically enable or disable agents 314 as required by the needs of the business.

Each daemon service 310 is responsible for constructing and tearing down instances of application domains 312 that will house different instances of agents 314. The service can do this work at run time without the need to be stopped or started, thus preventing service interruptions to other agents 314 running within the service. Each application domain 312 houses an agent 314, thereby providing a layer of isolation from other application domains 312 running within the daemon service 310. Accordingly, agents 314 running in an application domain 312 do not share the same physical resources or code base as other agents 314 running in different application domains 312 in the same daemon service 310.

Figure 4:
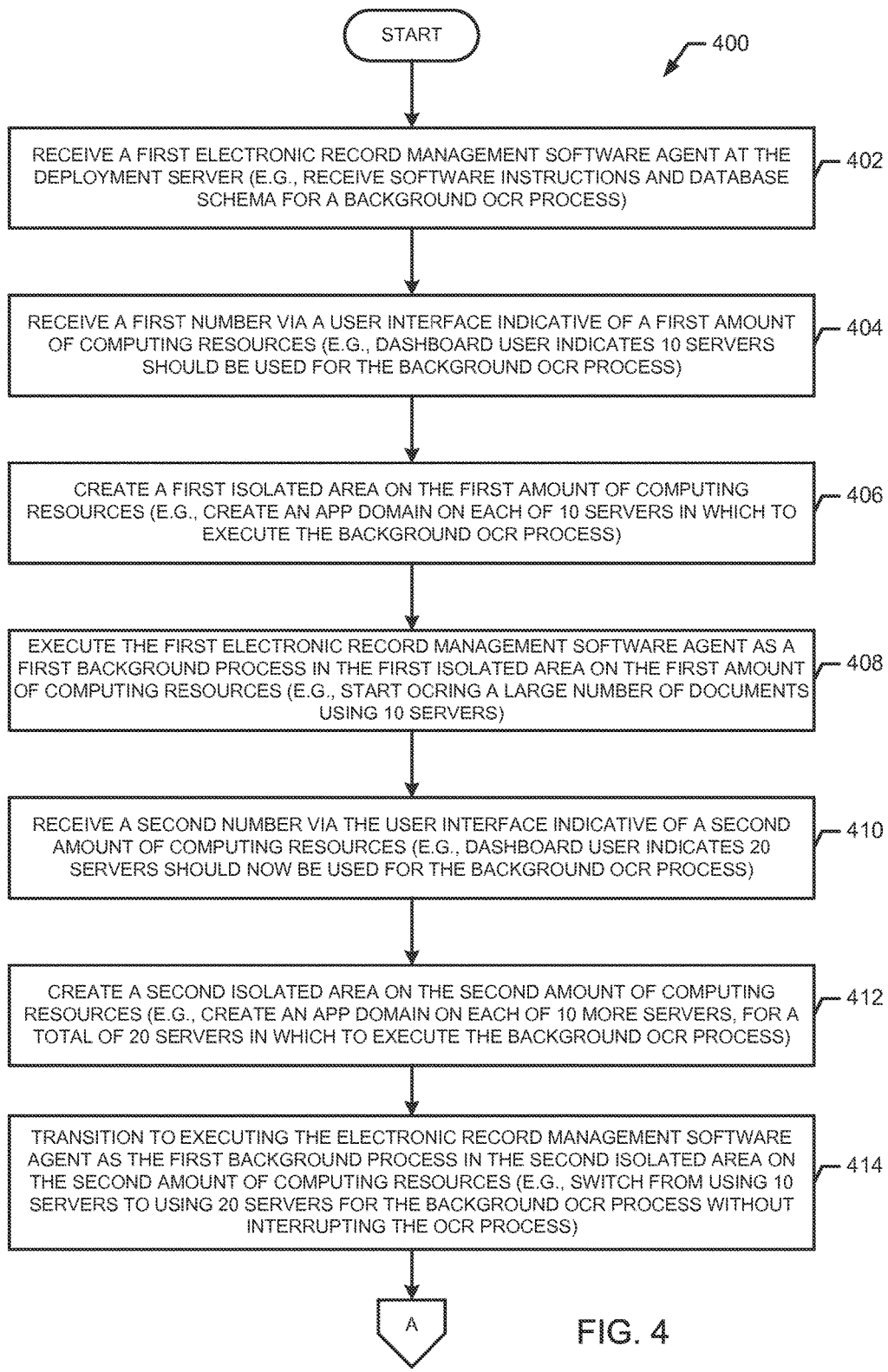
FIGS. 4-6 are a flowchart of an example process for dynamically deploying software agents.
Figure 5:
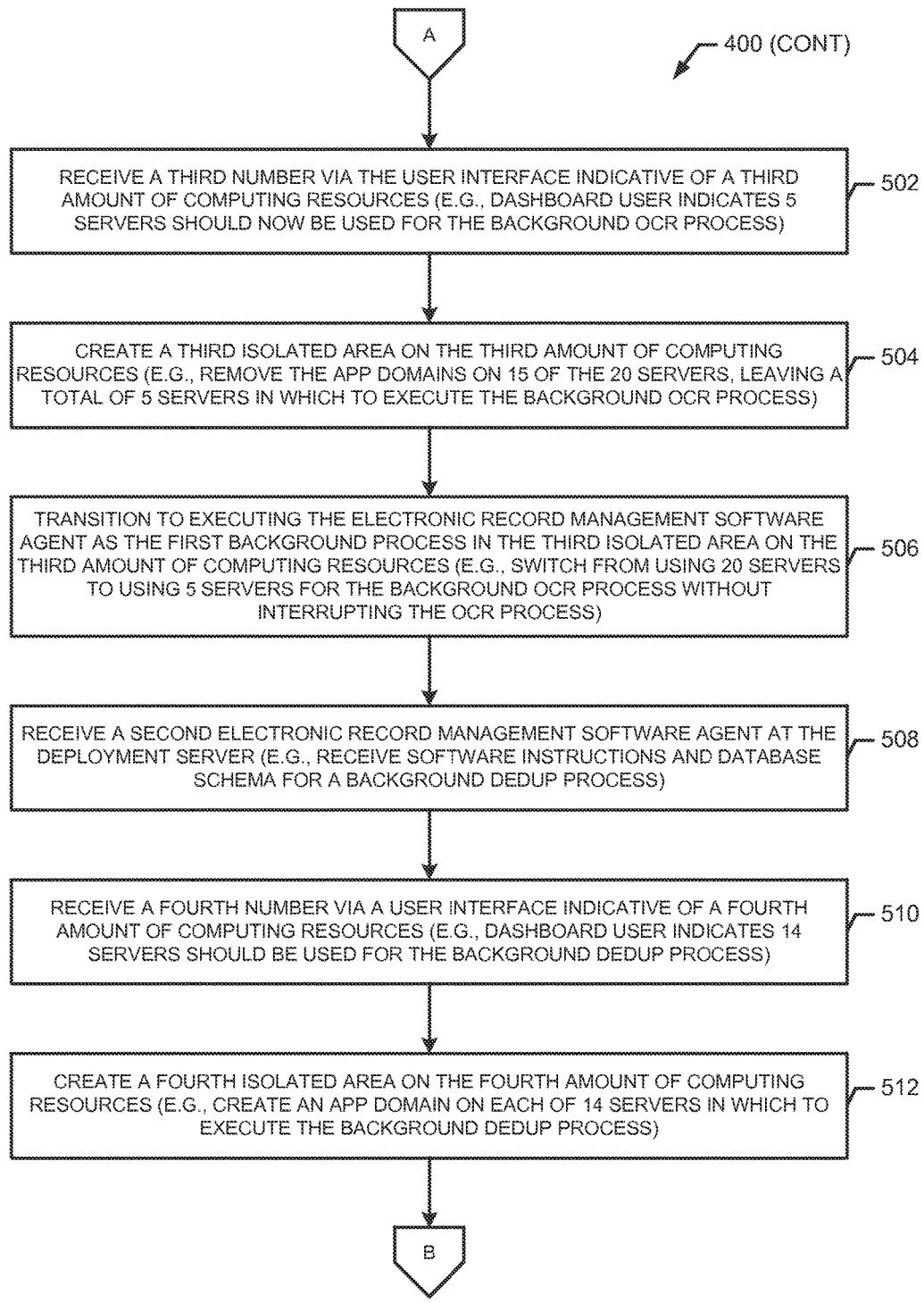
Figure 6:
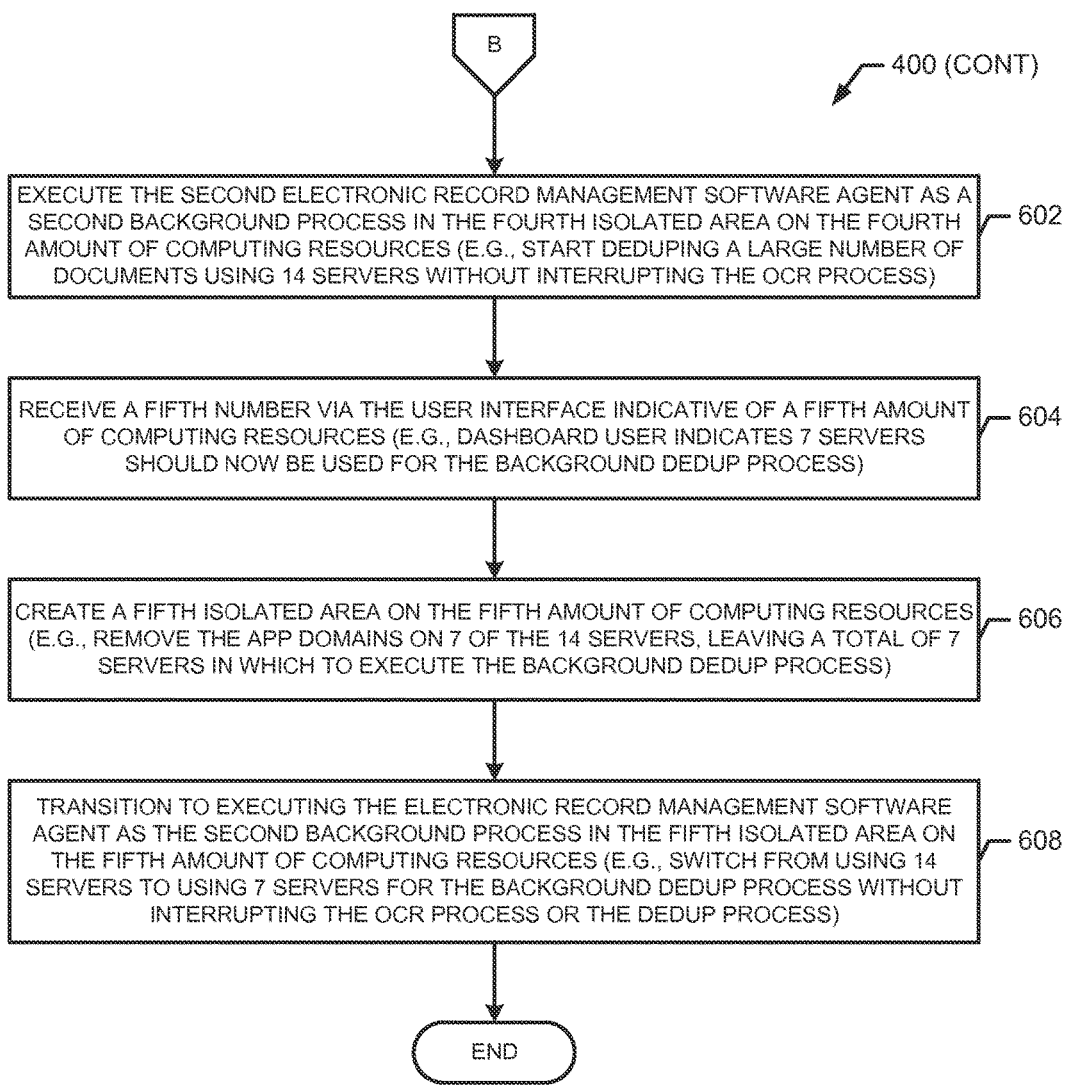

A flowchart of an example process 400 for dynamically deploying software agents is illustrated in FIG. 4. The process 400 may be carried out by one or more suitably programmed processors, such as a CPU executing software (e.g., block 204 of FIG. 2). The process 400 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 400 is described with reference to the flowchart illustrated in FIG. 4, it will be appreciated that many other methods of performing the acts associated with process 400 may be used. For example, the order of many of the operations may be changed, and some of the operations described may be optional.

In general, a user of an electronic record management system may deploy a plurality of different background processes (e.g., OCR, dedup, etc.) that may each take several hours to complete. Subsequently, the user may decide to change the number of servers dedicated to one or more background process. In addition, the user may decide to deploy additional background processes. Neither of these user actions interrupts any of the background processes.

More specifically, in this example, the process 400 begins when a deployment server receives a first electronic record management software agent (block 402). For example, the deployment server may receive software instructions and database schema for a background optical character recognition (OCR) process. The deployment server then receives a first number via a user interface indicative of a first amount of computing resources (block 404). For example, a dashboard user may indicate that 10 servers should be used for the background OCR process. The deployment server then creates a first isolated area on the first amount of computing resources (block 406). For example, the deployment server may create an application domain or sandbox on each of 10 servers in which to execute the background OCR process. The application domain on one server may be the same or different as the application domain used on another server. However, each application domain on the same server is preferably unique with respect to that server.

The first amount of computing resources then executes the first electronic record management software agent as a first background process in the first isolated area (block 408). For example, the servers may start OCRing a large number of documents. The deployment server then receives a second number via the user interface indicative of a second amount of computing resources (block 410). For example, the dashboard user may indicate that twenty servers should now be used for the background OCR process. The deployment server then creates a second isolated area on the second amount of computing resources (block 412). For example, the deployment server may create an application domain or sandbox on each of 10 more servers, for a total of 20 servers in which to execute the background OCR process.

The first background process then transitions to executing the electronic record management software agent as the first background process in the second isolated area on the second amount of computing resources (block 414). For example, the background OCR process may switch from using 10 servers to using 20 servers without interrupting the OCR process. The deployment server then receives a third number via the user interface indicative of a third amount of computing resources (block 502). For example, the dashboard user indicates five servers should now be used for the background OCR process. The deployment server then creates a third isolated area on the third amount of computing resources (block 504). For example, the deployment server may remove the application domain or sandbox on 15 of the 20 servers, leaving a total of 5 servers in which to execute the background OCR process.

The first background process then transitions to executing the electronic record management software agent as the first background process in the third isolated area on the third amount of computing resources (block 506). For example, the background OCR process switches from using twenty servers to using five servers without interrupting the OCR process.

The deployment server then receives a second electronic record management software agent (block 508). For example, the deployment server may receive software instructions and database schema for a background deduplication process. The deployment server then receives a fourth number via the user interface indicative of a fourth amount of computing resources (block 510). For example, the dashboard user indicates fourteen servers should be used for the background dedup process. The deployment server then creates a fourth isolated area on the fourth amount of computing resources (block 512). For example, the deployment server may create an application domain or sandbox on each of 14 servers in which to execute the background deduplication process.

The fourth amount of computing resources then executes the second electronic record management software agent as a second background process in the fourth isolated area (block 602). For example, fourteen servers may start deduping a large number of documents without interrupting the OCR process. The deployment server then receives a fifth number via the user interface indicative of a fifth amount of computing resources (block 604). For example, the dashboard user may indicate that seven servers should now be used for the background deduplication process. The deployment server then creates a fifth isolated area on the fifth amount of computing resources (block 606). For example, the deployment server may remove the application domain or sandbox on 7 of the 14 servers, leaving a total of 7 servers in which to execute the background deduplication process.

The second background process then transitions to executing the electronic record management software agent as the second background process on the fifth isolated area on the fifth amount of computing resources (block 608). For example, the background deduplication process may switch from using fourteen servers to using seven servers without interrupting the OCR process or the deduplication process.

In summary, persons of ordinary skill in the art will readily appreciate that methods and apparatus for dynamically deploying software agents have been provided. Among other features, computing devices employing the disclosed system are able to change the number of servers dedicated to one or more background process and deploy additional background processes without interrupting any background processes.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of dynamically deploying software agents in an electronic record management system, the method comprising:
   receiving a first electronic record management software agent at a deployment server;
   receiving a first number via a user interface indicative of a first number of instances of the first electronic record management software agent;
   receiving, via the user interface, a first selection of a particular server to execute the first number of instances of the first electronic record management software agent;
   creating a first sandbox for executing the first number of instances of the first electronic record management software agent on the particular server;
   executing the first number of instances of the first electronic record management software agent as a first background process in the first sandbox on the particular server;
   receiving a second number via the user interface indicative of a second number of instances of the first electronic record management software agent;
   creating a second sandbox for executing the second number of instances of the first electronic record management software agent on the particular server; and
   transitioning to executing the second number of instances of the first electronic record management software agent as the first background process in the second sandbox on the particular server without interrupting and without restarting the first electronic record management software agent.

2. The method of claim 1, wherein receiving the first electronic record management software agent includes receiving software instructions and database schema.

3. The method of claim 1, further comprising:
- receiving a second electronic record management software agent at the deployment server;
- receiving a third number via the user interface indicative of a first number of instances of the second electronic record management software agent;
- creating a third sandbox for executing the first number of instances of the second electronic record management software agent on the particular server;
- executing the first number of instances of the second electronic record management software agent as a second background process in the third sandbox on the particular server;
- receiving a fourth number via the user interface indicative of a second number of instances of the second electronic record management software agent;
- creating a fourth sandbox for executing the second number of instances of the second electronic record management software agent on the particular server; and
- transitioning to executing the second number of instances of the second electronic record management software agent as the second background process in the fourth sandbox on the particular server without interrupting and without restarting the second electronic record management software agent.

4. The method of claim 3, wherein the first electronic record management software agent executes continuously without being interrupted and without being restarted from (i) a first time coinciding with when the second electronic record management software agent is received at the deployment server and (ii) a second time coinciding with when the first number of instances of the second electronic record management software agent executes as the second background process on the particular server.

5. The method of claim 4, wherein the first electronic record management software agent executes continuously without being interrupted and without being restarted when the second electronic record management software agent transitions from being executed as the second background process in the third sandbox on the particular server to being executed as the second background process in the fourth sandbox on the particular server.

6. The method of claim 3, wherein the first electronic record management software agent is from a first business entity and the second electronic record management software agent is from a second different business entity.

7. The method of claim 3, wherein the second electronic record management software agent is a new version of the first electronic record management software agent.

8. The method of claim 3, further comprising:
- receiving instructions to modify the first electronic record management software agent after the first number of instances of the first electronic record management software agent executes as the first background process on the particular server; and
- executing the instructions on the first electronic record management software agent without interrupting and without restarting the first electronic record management software agent.

9. The method of claim 8, wherein the first electronic record management software agent and the second electronic record management software agent execute continuously from (i) a first time coinciding with when the instructions to modify the first electronic record management software agent are received and (ii) a second time coinciding with when the instructions are executed.

10. An apparatus for dynamically deploying software agents in an electronic record management system, the apparatus comprising:
- a processor;
- a network interface operatively coupled to the processor; and
- a memory device operatively coupled to the processor, the memory device storing instructions to cause the processor to:
  - receive a first electronic record management software agent at a deployment server;
  - receive a first number via a user interface indicative of a first number of instances of the first electronic record management software agent;
  - receive a first selection of a particular server to execute the first number of instances of the first electronic record management software agent;
  - create a first sandbox for executing the first number of instances of the first electronic record management software agent on the particular server;
  - execute the first number of instances of the first electronic record management software agent as a first background process in the first sandbox on the particular server;
  - receive a second number via the user interface indicative of a second number of instances of the first electronic record management software agent;
  - create a second sandbox for executing the second number of instances of the first electronic record management software agent on the particular server; and
  - transition to executing the second number of instances of the first electronic record management software agent as the first background process in the second sandbox on the particular server without interrupting and without restarting the first electronic record management software agent.

11. The apparatus of claim 10, wherein the instructions are structured to cause the processor to receive software instructions and database schema.

12. The apparatus of claim 10, wherein the instructions are structured to cause the processor to:
- receive a second electronic record management software agent at the deployment server;
- receive a third number via the user interface indicative of a first number of instances of the second electronic record management software agent;
- create a third sandbox for executing the first number of instances of the second electronic record management software agent on the particular server;
- execute the first number of instances of the second electronic record management software agent as a second background process in the third sandbox on the particular server;
- receive a fourth number via the user interface indicative of a second number of instances of the second electronic record management software agent;
- create a fourth sandbox for executing the second number of instances of the second electronic record management software agent on the particular server; and
- transition to executing the second number of instances of the second electronic record management software agent as the second background process in the fourth sandbox on the particular server without interrupting and without restarting the second electronic record management software agent.

13. The apparatus of claim 12, wherein the first electronic record management software agent executes continuously without being interrupted and without being restarted from (i) a first time coinciding with when the second electronic record management software agent is received at the deployment server and (ii) a second time coinciding with when the first number of instances of the second electronic record management software agent executes as the second background process on the particular server.

14. The apparatus of claim 13, wherein the first electronic record management software agent executes continuously without being interrupted and without being restarted when the second electronic record management software agent transitions from being executed as the second background process in the third sandbox on the particular server to being executed as the second background process in the fourth sandbox on the particular server.

15. The apparatus of claim 12, wherein the first electronic record management software agent is from a first business entity and the second electronic record management software agent is from a second different business entity.

16. The apparatus of 12, wherein the second electronic record management software agent is a new version of the first electronic record management software agent.

17. The apparatus of claim 12, wherein the instructions are structured to cause the processor to:
receive instructions to modify the first electronic record management software agent after the first number of instances of the first electronic record management software agent executes as the first background process on the particular server; and
execute the instructions on the first electronic record management software agent without interrupting and without restarting the first electronic record management software agent.

18. The apparatus of claim 17, wherein the first electronic record management software agent and the second electronic record management software agent execute continuously from (i) a first time coinciding with when the instructions to modify the first electronic record management software agent are received and (ii) a second time coinciding with when the instructions are executed.

19. A non-transitory computer readable medium storing instructions structured to cause a computing device to:
receive a first electronic record management software agent at a deployment server;
receive a first number via a user interface indicative of a first number of instances of the first electronic record management software agent;
receive a first selection of a particular server to execute the first number of instances of the first electronic record management software agent;
create a first sandbox for executing the first number of instances of the first electronic record management software agent on the particular server;
execute the first number of instances of the first electronic record management software agent as a first background process in the first sandbox on the particular server;
receive a second number via the user interface indicative of a second number of instances of the first electronic record management software agent;
create a second sandbox for executing the second number of instances of the first electronic record management software agent on the particular server; and
transition to executing the second number of instances of the first electronic record management software agent as the first background process in the second sandbox on the particular server without interrupting and without restarting the first electronic record management software agent.

20. The computer readable medium of claim 19, wherein the instructions are structured to cause the processor to receive software instructions and database schema.

21. The computer readable medium of claim 19, wherein the instructions are structured to cause the processor to:
receive a second electronic record management software agent at the deployment server;
receive a third number via the user interface indicative of a first number of instances of the second electronic record management software agent;
create a third sandbox for executing the first number of instances of the second electronic record management software agent on the particular server;
execute the first number of instances of the second electronic record management software agent as a second background process in the third sandbox on the particular server;
receive a fourth number via the user interface indicative of a second number of instances of the second electronic record management software agent;
create a fourth sandbox for executing the second number of instances of the second electronic record management software agent on the particular server; and
transition to executing the second number of instances of the second electronic record management software agent as the second background process in the fourth sandbox on the particular server without interrupting and without restarting the second electronic record management software agent.

22. The computer readable medium of claim 21, wherein the first electronic record management software agent executes continuously without being interrupted and without being restarted from (i) a first time coinciding with when the second electronic record management software agent is received at the deployment server and (ii) a second time coinciding with when the first number of instances of the second electronic record management software agent executes as the second background process on the particular server.

23. The computer readable medium of claim 22, wherein the first electronic record management software agent executes continuously without being interrupted and without being restarted when the second electronic record management software agent transitions from being executed as the second background process in the third sandbox on the particular server to being executed as the second background process in the fourth sandbox on the particular server.

24. The computer readable medium of claim 21, wherein the first electronic record management software agent is from a first business entity and the second electronic record management software agent is from a second different business entity.

25. The computer readable medium of claim 21, wherein the second electronic record management software agent is a new version of the first electronic record management software agent.

26. The computer readable medium of claim 21, wherein the instructions are structured to cause the processor to:
receive instructions to modify the first electronic record management software agent after the first number of instances of the first electronic record management software agent executes as the first background process on the particular server; and execute the instructions on the first electronic record management software agent without interrupting and without restarting the first electronic record management software agent.

27. The computer readable medium of claim 26, wherein the first electronic record management software agent and the second electronic record management software agent execute continuously from (i) a first time coinciding with when the instructions to modify the first electronic record management software agent are received and (ii) a second time coinciding with when the instructions are executed.

* * * * *